(No Model.)
E. P. OWSLEY.
MINNOW BOAT.
No. 367,056. Patented July 26, 1887.
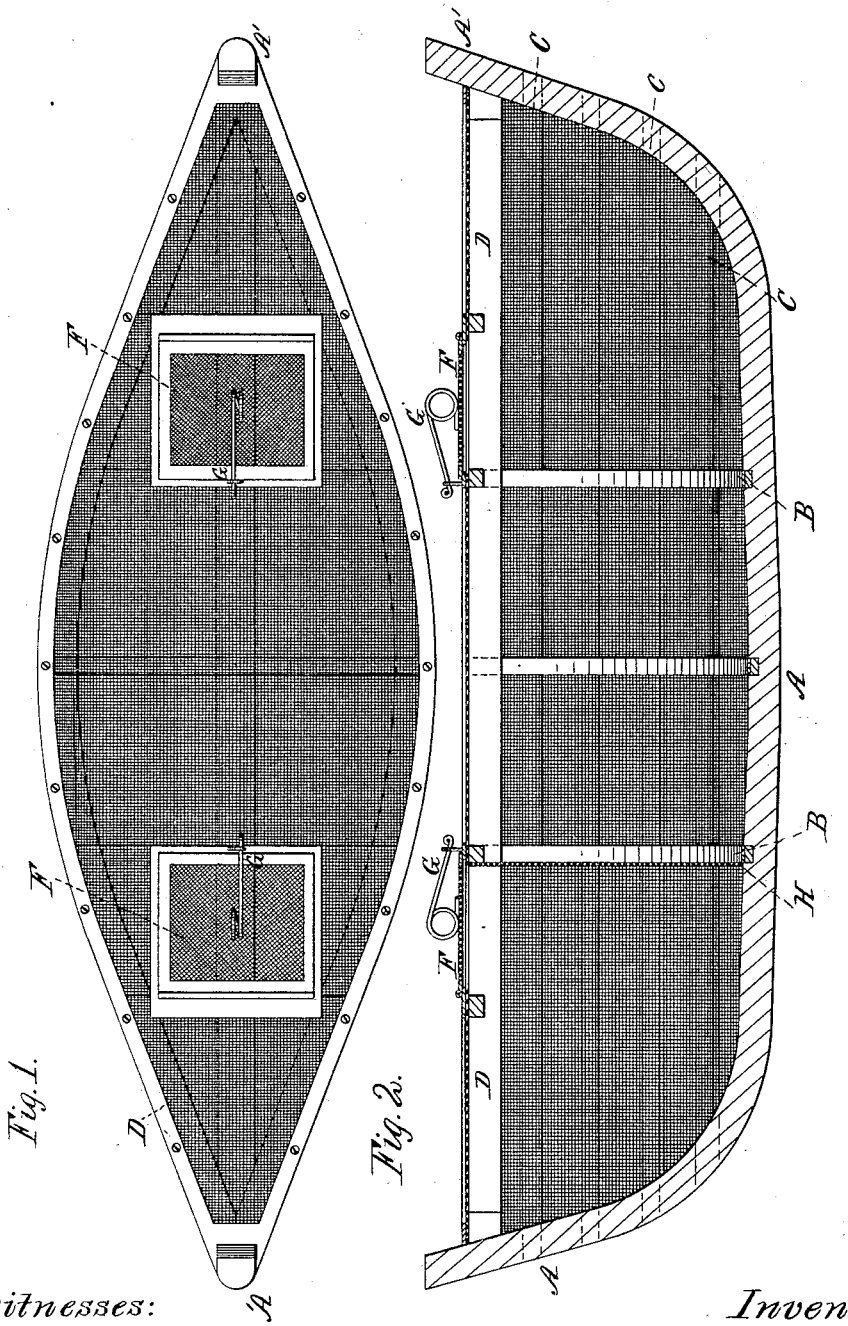
Witnesses:
W. C. Jirdinston.
George Heidman.
Inventor:
E P Owsley
by Arthur Stem
his Attorney.

UNITED STATES PATENT OFFICE.

EPHRAIM P. OWSLEY, OF STANFORD, KENTUCKY.

MINNOW-BOAT.

SPECIFICATION forming part of Letters Patent No. 367,056, dated July 26, 1887.

Application filed May 5, 1887. Serial No. 237,270. (No model.)

*To all whom it may concern:*

Be it known that I, EPHRAIM P. OWSLEY, a citizen of the United States, residing at Stanford, county of Lincoln, and State of Kentucky, have invented certain new and useful Improvements in Minnow-Boats, of which the following is a full, clear, and exact description, reference being had to the accompanying drawings, forming part of this specification.

My invention relates to an improvement in minnow-boats for carrying live bait in fishing; and it consists of a boat with perforated sides, permitting a constant flow of fresh water through the boat, by which the bait or fish in the boat are kept alive until wanted, the novel features of which will be more fully hereinafter set forth.

In the accompanying drawings, forming part of this specification, Figure 1 is a top plan view of my improved boat. Fig. 2 is a side elevation in section.

Like letters of reference indicate identical parts.

A A' is a curved timber forming the keel and stem and stern posts.

B are the ribs, of which any convenient number may be used, and C are the longitudinal timbers extending from stem to stern and attached to the ribs B. These parts form the skeleton of a boat. Around the top or upper edge I arrange a strip of cork, D, sufficiently large to float the boat; or, if preferred, air-tight tubing may be used. The entire skeleton of the boat is covered or lined with a wire netting or gauze to permit the free passage of water.

F F are doors in the top fastened with spring-catches G. The boat is attached by a cord to the boat occupied by the fisherman and floats behind it, and moves through the water with very little resistance. At H is shown a transverse partition of wire-gauze separating the boat into two compartments. The smaller one is used to hold the live minnows for bait and the larger one for the catch of fish, so that the fish are all kept alive until needed with perfect safety and great convenience and advantage.

I am aware that it is not new to use wire-gauze in the construction of minnow-buckets, and do not claim, broadly, such construction.

Having thus fully described my invention, what I claim, and desire to secure, is—

A minnow-boat consisting of a skeleton of wood or metal covered on all sides with wire-gauze and suspended in the water by cork or air-tight floats, the boat provided with an interior partition of wire-gauze to divide it into compartments for the catch and bait, substantially as and for the purpose described.

EPHRAIM P. OWSLEY.

Witnesses:
 JAS. T. CRAIG,
 JAS. SEVERANCE.